United States Patent [19]

Koshida et al.

[11] Patent Number: 5,358,536

[45] Date of Patent: Oct. 25, 1994

[54] DYESTUFF FOR HEAT-SENSITIVE TRANSFER RECORD AND TRANSFER SHEET CONTAINING SAME

[75] Inventors: Hitoshi Koshida; Isamu Ghoda, both of Hyougo; Tsukasa Ohyama; Keisuke Takuma, both of Fukuoka, all of Japan

[73] Assignee: Mitsui Toatsu Chemicals, Incorporated, Tokyo, Japan

[21] Appl. No.: 921,805

[22] Filed: Jul. 31, 1992

[30] Foreign Application Priority Data

Jul. 31, 1991 [JP] Japan .................................. 3-191544
Jul. 31, 1991 [JP] Japan .................................. 3-191552

[51] Int. Cl.$^5$ ........................ B41M 5/26; C09B 56/00
[52] U.S. Cl. ........................................... 8/471; 8/639; 8/640; 8/642; 8/662
[58] Field of Search ............... 8/662, 536, 639, 693, 8/640, 642, 471; 556/113, 114, 115

[56] References Cited

U.S. PATENT DOCUMENTS

| | | | |
|---|---|---|---|
| 4,013,405 | 3/1977 | Donenfeld | 8/471 |
| 4,224,026 | 9/1980 | Reinhardt | 8/532 |
| 4,289,694 | 9/1981 | Belfort | 556/113 |
| 5,126,311 | 6/1992 | Evans et al. | 503/227 |

FOREIGN PATENT DOCUMENTS

| | | |
|---|---|---|
| 0030028 | 11/1980 | European Pat. Off. ........ D06P 5/00 |
| 0093926 | 11/1983 | European Pat. Off. . |
| 0148433 | 7/1985 | European Pat. Off. . |
| 2840825 | of 0000 | Fed. Rep. of Germany .......... D06P 5/13 |
| 3005865 | 9/1981 | Fed. Rep. of Germany . |
| 4200739 | 1/1991 | Fed. Rep. of Germany . |
| 62-55194 | 3/1987 | Japan . |

OTHER PUBLICATIONS

CA 112:22338z, 22 Jan. 1990, Kraska et al, "Disperse Blue azo dyes derived from 3-amino-5-nitro-2,1-benzisotheazole"p. 80 (abstract).
CA 112:120598d, 2 Apr. 1990, Kraska et al, "Blue Disperse nitrobenzisothiazole azo dyes for polyester fibers" p. 89 (abstract).
Sokolowska-Gajda, "The Application of Some Alkyl Esters of Alkoxy Derivatives of N-Benzyl-N--phenyl-$\beta$-alanine in the Synthesis of 3-Amino-5-nitro[2,1]benzisothiazole-Based Dyes", *Dyes and Pigments* 18 (1992) No. 2 pp. 103–113.
Janssens et al "Thermal Dye Transfer" Dec. 1990 Res. Discl., 320, pp. 928–939.

*Primary Examiner*—Paul Lieberman
*Assistant Examiner*—Margaret Einsmann
*Attorney, Agent, or Firm*—Millen, White, Zelano & Branigan

[57] ABSTRACT

According to the present invention, there can be provided a black dyestuff for heat-sensitive transfer record comprising at least one orange dyestuff represented by the formula

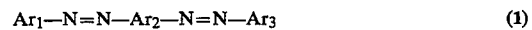

$$Ar_1-N=N-Ar_2-N=N-Ar_3 \qquad (1)$$

[wherein each of $Ar_1$, $Ar_2$ and $Ar_3$ is independently an aryl group which may have a substituent] and at least one blue dyestuff represented by the formula

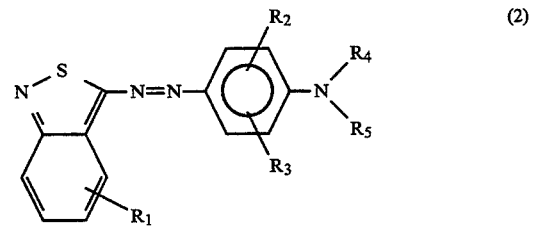

(2)

[wherein each of $R_1$, $R_2$ and $R_3$ is independently a hydrogen atom, halogen atom, nitro group, hydroxyl group, alkyl group which may have a substituent, alkoxy group, alkylsulfonylamino group or alkylcarbonylamino group, and each of $R_4$ and $R_5$ is independently an alkyl group which may have a substituent, and a black heat-sensitive transfer sheet in which the above-mentioned dyestuff is used.

2 Claims, No Drawings

DYESTUFF FOR HEAT-SENSITIVE TRANSFER RECORD AND TRANSFER SHEET CONTAINING SAME

BACKGROUND OF THE INVENTION (i) Field of the Invention

The present invention relates to a black dyestuff for heat-sensitive transfer record and a heat-sensitive transfer sheet containing the dyestuff.

Furthermore, the present invention relates to a blue dyestuff for heat-sensitive transfer record, particularly a blue dyestuff which is useful as a blue component of a blend black dyestuff for use in black record.

(ii) Description of the Prior Art

A heat-sensitive transfer system comprises superposing a heat transfer sheet coated with an ink containing a dyestuff for sublimation heat transfer upon an image receiving paper, and then pressing a thermal head against them to sublimate the dyestuff and to thereby transfer it to the image receiving paper, whereby a full color copy having a good gradation can be obtained.

The first feature of the heat-sensitive record system is that the thermal head is mainly used as a hard device and maintenance and reliability are excellent. The second feature of the heat-sensitive record system is that since a mixed color image can be obtained on a molecular level, there can be obtained a record similar to a silver salt color photograph which has excellent gradation and reproducibility.

In addition, this system is applied as a full color record system for computer graphics, a plate making system, video movies, a still video system, prepaid cards and the like, and hence much attention is paid to the above-mentioned heat-sensitive record system.

More specifically, the system of the present invention comprises heating a transfer sheet coated with a sublimable dyestuff by a thermal head controlled in accordance with a color signal of a still image to transfer the dyestuff to an image receiving paper, thereby recording the same thereon. As the dyestuffs for the transfer sheet, there are used three primary colors of yellow, magenta and cyan. Furthermore, in order to obtain the precise image in business and the like, four primary colors of the above-mentioned three colors and a black color can be used for the sake of the effect of light and shade.

Requirements for the black heat-sensitive transfer sheet are as follows.

(1) In a solvent of an ink and a binder resin which are used at the time of the coating of the transfer sheet, the dyestuff should be soluble and compatible.

(2) Heat energy at the time of the sublimation transfer of the dyestuff from the transfer sheet to an image receiving sheet should be as low as possible, and an image having a color value should be transferred to the image receiving sheet.

(3) A transmittance curve of the transferred black image should be flat in the wave length range of 400 to 700 nm.

(4) The dyestuff in the transfer sheet should not recrystallize even in a high-temperature or high-humidity state.

(5) The transferred image should be excellent in light resistance and shelf stability.

(6) The graduations of matrix dyestuffs for the black color are similar to each other.

Among these requirements, the particularly desired items are "the dyestuff should be soluble in a solvent of an ink and should be compatible with a binder resin" in the paragraph (1), and the requirements of the paragraphs (3) and (6).

That is, in the heat-sensitive transfer system, the dyestuff sublimates in the molecular state, and therefore the dyestuff is required to be completely dissolved in the binder resin on the transfer sheet. If the dyestuff which is not dissolved in the binder resin on the transfer. Sheet is transferred, any uniform image cannot be obtained and an image concentration is also low, so that a product value noticeably deteriorates.

Development has been continued so as to meet all of the above-mentioned requirements (1) to (6) necessary for the transfer sheet, and nowadays, it has been attempted to meet the requirement (3) by blending a plurality of sublimable dyestuffs. In addition, in order to obtain a good gradation, i.e., in order to meet the requirement (6), some matrix dyestuffs having the mutually similar gradations have been investigated as blend dyestuffs for the black color. However, any dyestuff for black transfer record which can meet all of these requirements (1) to (6) has not been developed, and further development is desired.

On the other hand, azo-based blue dyestuffs which have been heretofore suggested usually have a high molar absorptivity coefficient, and therefore most of the blue dyestuffs latently have a dyestuff concentration required for the transfer of the image. However, the blue dyestuff is less soluble in the solvent and less compatible with the binder resin, with the result that the blue dyestuff crystallizes on the transfer sheet and the heat transfer efficiency of the blue dyestuff noticeably deteriorates. Additionally, the adhesion of the transferred blue dyestuff to the image receiving paper is poor, and the image on the image receiving paper, when touched, is soiled, so that the quality of the image itself is impaired. Moreover, the blue dyestuff is poor in durability and particularly-light resistance which are most important, and it often has a problem that it cannot withstand a long-term storage. The dyestuffs by which these problems can be solved are extremely limited.

SUMMARY OF THE INVENTION

The present inventors have intensively researched to solve the above-mentioned problems, and they have developed a black blend dyestuff which can meet all of the above-mentioned requirements (1) to (6) and a transfer sheet containing this dyestuff. As a result, the present invention has been completed on the basis of them.

That is, the present invention is directed to a black dyestuff for heat-sensitive transfer record comprising at least one orange dyestuff represented by the formula (1)

$$Ar_1-N=N-Ar_2-N=N-Ar_3 \tag{1}$$

[wherein each of $Ar_1$, $Ar_2$ and $Ar_3$ is independently an aryl group which may have a substituent] and at least one blue dyestuff represented by the formula (2)

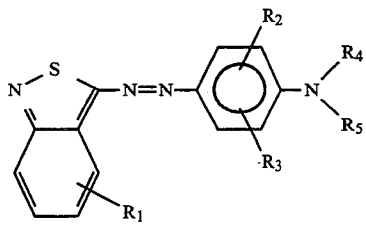

[wherein each of $R_1$, $R_2$ and $R_3$ is independently a hydrogen atom, halogen atom, nitro group, hydroxyl group, alkyl group which may have a substituent, alkoxy group, alkylsulfonylamino group or alkylcarbonylamino group, and each of $R_4$ and $R_5$ is independently an alkyl group which may have a substituent].

The present invention is also directed to a black dyestuff for heat-sensitive transfer record in which the blue dyestuff is represented by the formula (2) wherein $R_1$ is a hydrogen atom, halogen atom, alkyl group, alkoxy group or nitro group, $R_2$ and $R_3$ may be identical or different and each of them is independently a hydrogen atom, alkyl group, alkoxy group, alkylcarbonylamino group or alkylsulfonylamino group, $R_4$ is an alkyl group which may have a substituent, aralkyl group or alkylcarboxyethyl group, and $R_5$ is alkoxycarbonylethyl group.

The present invention is further directed to a blue dyestuff for heat transfer record represented by the formula (2) wherein $R_1$ is a hydrogen atom, halogen atom, alkyl group, alkoxy group or nitro group, $R_2$ and $R_3$ may be identical or different and each of them is independently a hydrogen atom, alkyl group, alkoxy group, alkylcarbonylamino group or alkylsulfonylamino group, $R_4$ is an alkyl group which may have a substituent, aralkyl group or alkylcarboxyethyl group, and $R_5$ is alkoxycarbonylethyl group.

In addition, the present invention is directed to a heat-sensitive transfer sheet containing the above-mentioned black dyestuff.

DETAILED DESCRIPTION OF THE PREFERRED EMBODIMENT

As described above, it has been found that when at least one of compounds having the formula (1) is blended with at least one of compounds having the formula (2) and the resultant blend is used as a black dyestuff, a transfer sheet which can meet all of the above-mentioned requirements (1) to (6) can be surprisingly obtained, and as a result, the present invention has been completed.

Furthermore, when a red dyestuff for heat-sensitive transfer which can absorb light having a wave length of from about 500 to about 550 nm is added to the above-mentioned black dyestuff, an absorption curve conveniently is further flat.

A color tone and spectral properties which are required in the black dyestuff of the present invention are utterly different from those of other three primary colors (yellow, magenta and cyan).

That is, spectral properties which are required in the respective dyestuffs of yellow, magenta and cyan are that each of these dyestuffs has a sharp absorption curve with the maximum absorption wave length as the center.

On the contrary, spectral properties which are required in the black dyestuff of the present invention are that the black dyestuff has an absorption curve near to a flat state under light having a wave length in the visible light region of from 400 to 700 nm.

With regard to the black transfer image of the sharp three primary colors on the transfer sheet, the shape of the absorption curve in the visible light region of from 400 to 700 nm has ups and downs particularly in the cast of a light color. As a result, when a different light source is used, the transferred image becomes, for example, reddish, greenish or bluish black, and in an extreme case, the tint of the image changes to such a color tone as cannot be perceived to be black at times. The above-mentioned image has the problem of color rendering. In other words, it is difficult to obtain the black color having the high color rendering by the use of the three primary colors.

The respective color dyestuffs to be blended for the black color should be selected so as to have similar sublimable properties. This reason is that if the respective dyestuffs have different sublimable properties, the image densities of these dyestuffs depend upon given heat energy, so that the color tone is also different between light colors and dense colors.

Therefore, the present invention can be achieved by blending the compound of the formula (1) and the compound of the formula (2) which can meet all of the requirements (1) to (6) as the black dyestuffs for heat-sensitive sublimation transfer. It is more preferable to add, to the above-mentioned black dyestuff, a red dyestuff which has the absorption wave length range of the compounds of the formulae (1) and (2), i.e., an absorption wave length range of from 500 to 550 nm and which can meet the above-mentioned requirements (1) to (6).

In the compound represented by the formula (1)

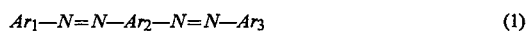

which is used in the present invention, each of $Ar_1$, $Ar_2$ and $Ar_3$ is an aryl group which may have a substituent. Preferable examples of the substituent include an alkyl group having 1 to 4 carbon atoms, halogen atom such as chlorine, nitro group and hydroxyl group.

Typical examples of the dyestuff of the formula (1) are as follows.

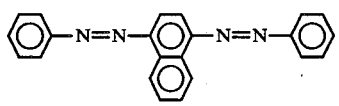

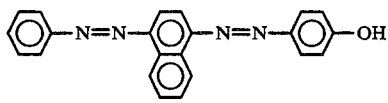

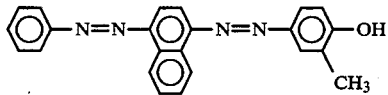

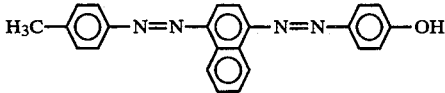

-continued

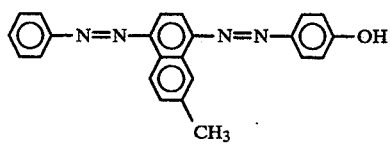
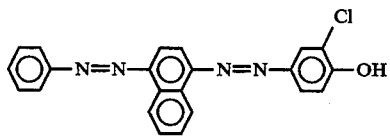
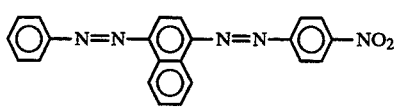
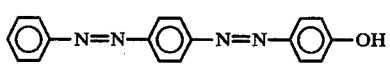
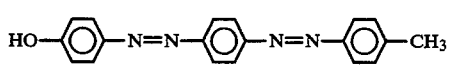
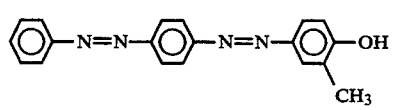
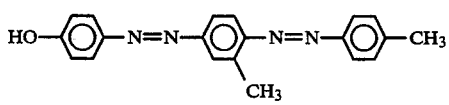
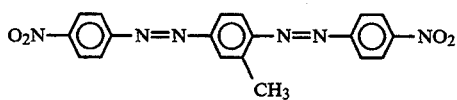
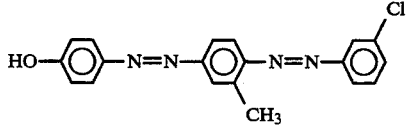
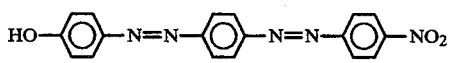
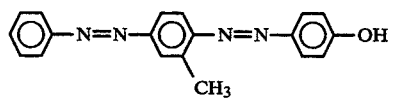
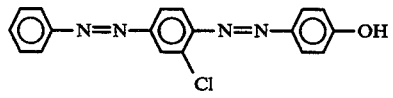
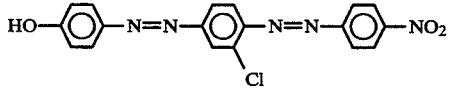
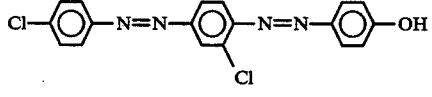

-continued

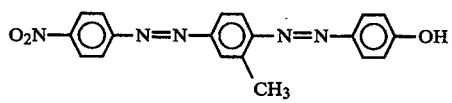
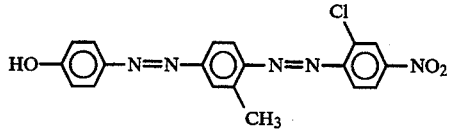
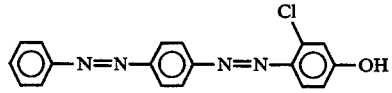
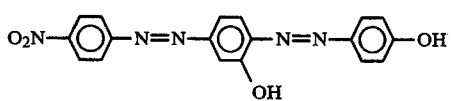

In the compound represented by the formula (2)

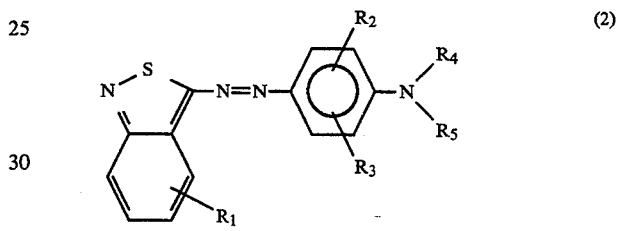

(2)

which is used in the present invention, typical examples of $R_1$ include a hydrogen atom, halogen atoms such as a chlorine atom, bromine atom and fluorine atom, alkyl groups such as a methyl group, ethyl group, propyl group and isopropyl group, alkoxy groups such as a methoxy group, ethoxy group and propoxy group, a hydroxyl group, an alkylcarbonylamino group in which the alkyl group has 1 to 4 carbon atoms, an alkylsulfonylamino group having 1 to 4 carbon atoms, and a nitro group.

Typical examples of $R_2$ and $R_3$ which are independent and which may be identical or different include a hydrogen atom, alkyl groups such as a methyl group, ethyl group, propyl group and isopropyl group, alkoxy groups such as a methoxy group, ethoxy group and propoxy group, alkylcarbonylamino groups such as an acetylamino group, ethylcarbonylamino group and n-propylcarbonylamino group, and alkylsulfonylamino groups such as a methylsulfonylamino group, ethylsulfonylamino group and n-propylsulfonylamino group.

Typical examples of $R_4$ include alkyl groups which has 1 to 8 carbon atoms. $R_4$ may have a substituent, such as a methyl group, ethyl group, butyl group, 2-hydroxyethyl group, 2-cyanoethyl group, 4-cyanobutyl group, aralkyl groups such as a benzyl group, phenethyl group, p-methylbenzyl group and p-ethoxyphenethyl group, and alkylcarboxyethyl groups such as a methylcarboxyethyl group, ethylcarboxyethyl group and isopropylcarboxyethyl group.

A typical example of $R_5$ is an alkoxycarbonylethyl group in which the alkyl group has 1 to 4 carbon atoms.

Typical examples of the dyestuff of the formula (2) are as follows:

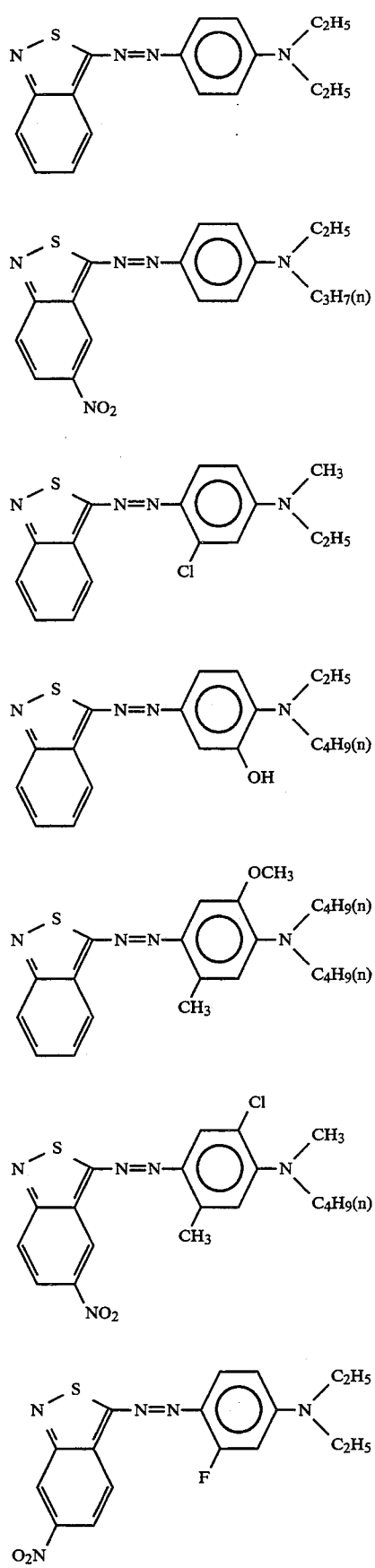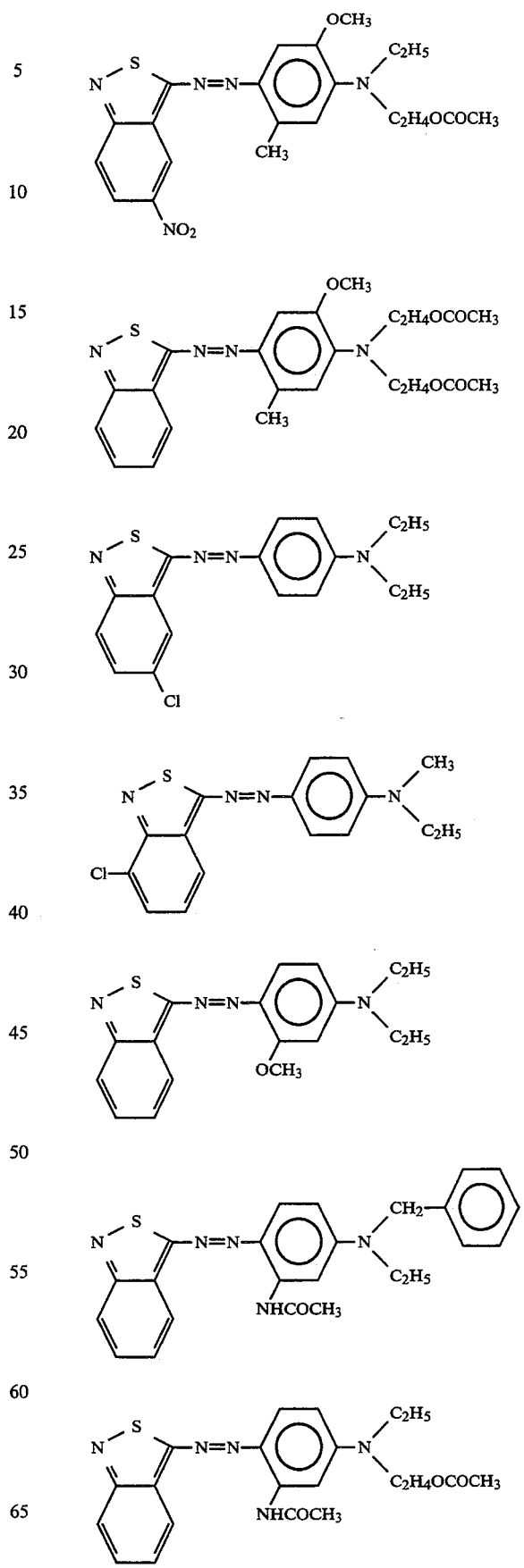

-continued

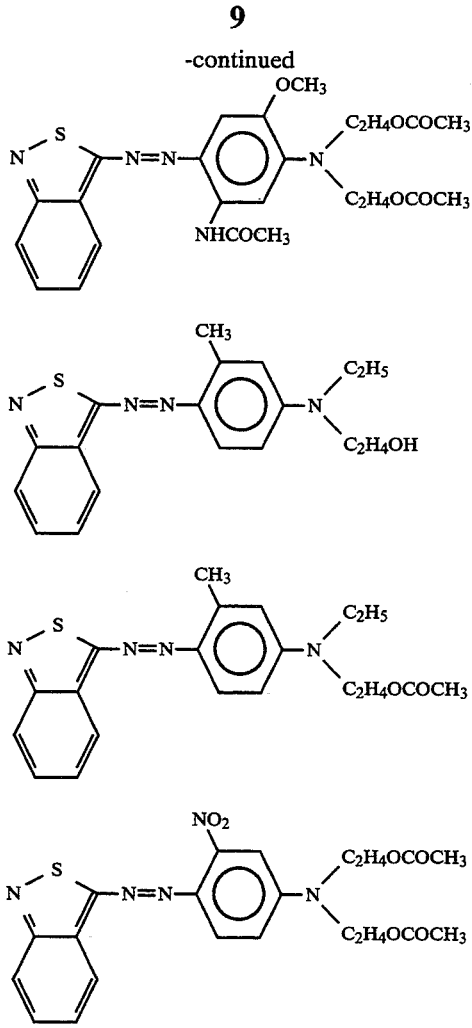

Furthermore, preferable examples of the red dyestuff which is used to make an absorption curve flatter are the following azo dyestuffs, but these dyestuffs are not restrictive.

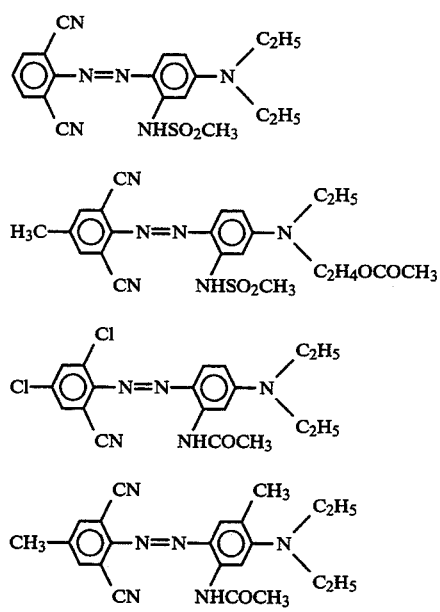

-continued

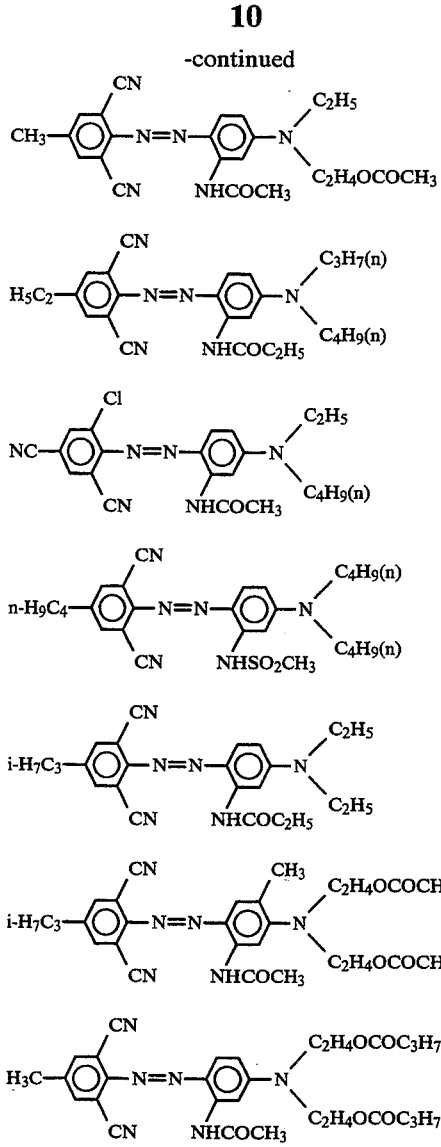

The dyestuff represented by the formula (1) of the present invention can be easily obtained by diazotizing a 3-amino-benzoylthiazole compound in a usual manner, and then carrying out a coupling reaction with an optional aniline.

Furthermore, the dyestuff represented by the formula (2) is a known compound and usually commercially available.

Additionally, in the case that the black dyestuff for transfer record is obtained by the use of the compounds represented by the formulae (1) and (2), a blend ratio the compound of the formula (1) to the compound of the formula (2) is preferably from 2:8 to 4:6.

The amount of the red dyestuff to be used to flatten the absorption curve is preferably in the range of from 0 to 30 parts by weight with respect to 100 parts by weight of the compounds represented by the formulae (1) and (2).

According to the research of the present inventors, it has been found that the light resistance of the image transferred by this print system, i.e., the light resistance of the dyestuff adhered to the image receiving paper depends largely upon a terminal group of the dyestuff, though its skeleton is not influential.

For example, comparing the terminal groups X, Y and X of the compound having the following formula (2'), the tendency of the light resistance is apparent:

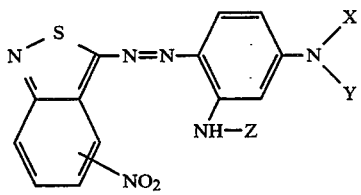

That is, the light resistance can be effectively improved by suitably selecting the groups represented by X and Y, and it is apparent that the light resistance can be increased in the order of an alkyl group<alkoxyalkoxy group<halogenoalkyl group<cyanoalkyl group<alkylcarbonyloxyalkyl group which is X or Y. Thus, when X and Y both are the alkylcarbonyloxyalkyl groups, the light resistance is highest.

Table 1 shows typical examples of X, Y and Z. Here, the light resistance means a residual ratio of a color density in irradiating the image with light having an energy of 120 KJ/cm$^2$ by the use of a xenon feed meter.

TABLE 1

| X | Y | Z | Light Resistance (%) |
|---|---|---|---|
| —C$_2$H$_4$OCOCH$_3$ | —C$_2$H$_4$OCOCH$_3$ | —COCH$_3$ | 92.1 |
| —C$_2$H$_4$OCOC$_3$H$_7$(i) | —C$_2$H$_4$OCOC$_3$H$_7$(i) | —COCH$_3$ | 92.0 |
| —C$_2$H$_4$OCOCH$_3$ | —C$_2$H$_4$OCOCH$_3$ | —SO$_2$CH$_3$ | 87.3 |
| —C$_2$H$_4$OCOCH$_3$ | —C$_2$H$_5$ | —COCH$_3$ | 85.1 |
| —C$_2$H$_4$OCOCH$_3$ | —C$_2$H$_5$ | —SO$_2$CH$_3$ | 82.6 |
| —C$_2$H$_4$CN | —C$_2$H$_4$CN | —COCH$_3$ | 60.3 |
| —C$_2$H$_4$Cl | —C$_2$H$_4$Cl | —COCH$_3$ | 59.5 |
| —C$_2$H$_4$OC$_2$H$_5$ | —C$_2$H$_4$OC$_2$H$_5$ | —COCH$_3$ | 53.2 |
| —C$_2$H$_5$ | —C$_2$H$_5$ | —COCH$_3$ | 50.1 |
| —C$_2$H$_5$ | —C$_2$H$_5$ | —SO$_2$CH$_3$ | 47.6 |
| —CH$_2$CH=CH$_2$ | —CH$_2$CH=CH$_2$ | —COCH$_3$ | 28.4 |

The compound represented by the formula (2) is also excellent in solubility in a solvent and a binder resin and the dyestuff does not crystal at all even after the preparation of a transfer sheet. Therefore, even after a long-term storage, the utterly unchanged transfer density and clear image can be obtained. It is apparent from Table 2 that this effect is also due to the terminal groups. Here, the solubility of the compounds of the formula (2) in a 1:1 mixed solution of toluene and methyl ethyl ketone and sheet storage stability thereof were measured.

TABLE 2

| X | Y | Z | Solubility (%) | Sheet Shelf Stability |
|---|---|---|---|---|
| —C$_2$H$_4$OCOCH$_3$ | —C$_2$H$_4$OCOCH$_3$ | —COCH$_3$ | 8.5 | o |
| —C$_2$H$_4$OCOC$_3$H$_7$(i) | —C$_2$H$_4$OCOC$_3$H$_7$(i) | —COCH$_3$ | 10.7 | o |
| —C$_2$H$_4$OCOCH$_3$ | —C$_2$H$_5$ | —SO$_2$CH$_3$ | 7.6 | o |
| —C$_2$H$_4$CN | —C$_2$H$_4$CN | —COCH$_3$ | 4.2 | x |
| —C$_2$H$_4$Cl | —C$_2$H$_4$Cl | —COCH$_3$ | 2.3 | x |
| —C$_2$H$_4$OC$_2$H$_5$ | —C$_2$H$_4$OC$_2$H$_5$ | —COCH$_3$ | 4.6 | Δ |
| —C$_2$H$_5$ | —C$_2$H$_5$ | —COCH$_3$ | 3.7 | Δ |
| —C$_2$H$_5$ | —C$_2$H$_5$ | —SO$_2$CH$_3$ | 3.2 | x |
| —C$_4$H$_9$(n) | —C$_4$H$_9$(n) | —COCH$_3$ | 4.6 | Δ |

The storage stability of each sheet was judged by allowing it at room temperature for 2 weeks, and then observing a crystallization degree of the dyestuff by an optical microscope. With regard to the ranking of the storage stability, the unchanged, uniform and transparent sheets were denoted by ; the slightly crystallized sheets were denoted by Δ; and the completely crystallized sheets were denoted by x.

It is apparent that a compound such as the compound of the formula (2) having an alkylcarbonyloxyalkyl group as its terminal group is very excellent in solubility and sheet storage stability. Thus, the compound of the formula (2) has a good light resistance and solubility and a high transfer speed, and therefore it is suitable as a blue dyestuff for the formation of a clear and less turbid full color.

An ink for heat-sensitive transfer record containing the dyestuff of the present invention can be prepared by mixing the dyestuff with a suitable binder resin, solvent and the like.

The amount of the dyestuff in the ink for heat-sensitive transfer record is usually in the range of from 5 to 10% by weight.

The binder resin which can be used to prepare the ink is what is used in a usual printing ink, and examples of the binder resin include oil resins such as rosin, phenol, xylene, petroleum, vinyl, polyamide, alkyd, nitro-cellulose and alkylcellulose resins, and aqueous resins such as maleic and acrylic resins, casein, shellac and glue.

Examples of the solvent for the preparation of the ink include alcohols such as methanol, ethanol, propanol and butanol, cellosolves such as methyl cellosolve and ethyl cellosolve, aromatics such as benzene, toluene and xylene, esters such as ethyl acetate and butyl acetate, ketones such as acetone, methyl ethyl ketone and cyclohexanone, hydrocarbons such as ligroin, cyclohexane and kerosene, and methylformamide. In the case that the aqueous resin is used, water and a mixture of water and the above-mentioned water soluble solvent can be also used.

The transfer sheet can be prepared by coating a suitable substrate with the ink for record obtained by the above-mentioned method.

Examples of the substrate which is coated with the ink include thin papers such as a condenser paper and glassine paper, and plastic films such as a polyester, polyamide and polyimide. The thickness of this substrate is suitably in the range of from 2 to 50 μm in order to improve the transfer efficiency of heat from a thermal head to the dyestuff.

The transfer of the heat can be achieved by superposing the sheet upon a material to be recorded, and then heating and pressing the sheet from its back surface by a thermal head, whereby the dyestuff on the sheet can be transferred onto the material to be recorded.

Examples of the material to be recorded include fibers, fabrics, films, sheets and molded articles made of polyolefin resins such as polyethylene and polypropylene, halogenated polymers such as polyvinyl chloride and polyvinylidene chloride, vinyl polymers such as polyvinyl alcohol, polyvinyl acetate and polyacrylic ester, polyester resins such as polyethylene terephthalate and polybutylene terephthalate, polystyrene resins, polyamide resins, copolymer resins of olefins such as ethylene and propylene and other vinyl monomers, ionomers, cellulose resins such as cellulose diacetate and cellulose triacetate, polycarbonate, polysulfone and polyimide. Particularly preferable are fabrics, sheets and films made of polyethylene terephthalate.

In addition, as the materials to be recorded, there can be also used papers coated and laminated with a mixture of a resin used to prepare the above-mentioned ink and acidic particles such as silica gel, papers laminated with resin films, and specific converted papers subjected to acetylation. The employment of such papers results in the good record having an excellent image stability at high temperature and high humidity. Moreover, films of various kinds of resins and synthetic papers made thereof can be also used. After the transfer record, for example, a polyester film is thermally pressed on a transfer record surface to laminate the film thereon, whereby the color development of the dyestuff can be improved and the record can be stably preserved.

In the black sublimation transfer sheet prepared by the use of one or more of the dyestuffs represented by the formula (1) of the present invention, one or more of the dyestuffs represented by the formula (2) and, if necessary, the red dyestuff, the solubility of the blended dyestuffs in the solvent and the binder resin is good. Therefore, the dyestuffs can be stably preserved in the binder resin on the sheet.

Furthermore, on the transfer sheet of the present invention, the sublimation of the ink can be rapidly carried out by the heating of the thermal head at the time of the transfer, and the color tone transferred on the image receiving paper is a black color similar to carbon black and the color value of the transferred dyestuff is also high. In addition, the sublimable properties of the respective dyestuffs are similar to one another, and the transfer can be achieved without changing the color tone of from gray to black. The transfer sheet has a very good storage stability, and it is fair to say that the black sublimation transfer sheet of the present invention is practically valuable.

With regard to the azo dyestuff represented by the formula (2), the sublimation transfer amount of the dyestuff can be controlled by changing the energy given to the thermal head at the time of the heat transfer, and therefore the gradation record can be easily achieved. Thus, the azo dyestuff is suitable for the full color record. In addition, the azo dyestuff is stable to heat, light, humidity and chemicals, and it does not thermally decompose during the transfer record. The shelf stability of the obtained record is also excellent.

The above-mentioned dyestuff is excellent in solubility in the organic solvent and dispersion in water, and so it is easy to prepare the highly concentrated and uniformly dissolved or dispersed ink. In consequence, the record having a good color density can be obtained. It is sure that the dyestuff of the formula (2) is practically valuable.

Now, the present invention will be described in detail in reference to examples. In these examples, "part(s)" and "%" are on weight.

Example 1

(1) Preparation of ink 4.5 parts by weight of an orange compound represented by the formula (3)

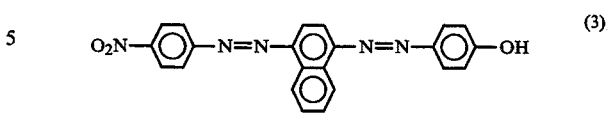

5.5 parts by weight of a blue compound represented by the formula (4)

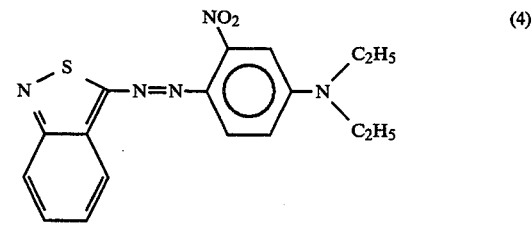

2.0 parts by weight of a red dyestuff represented by the formula (5)

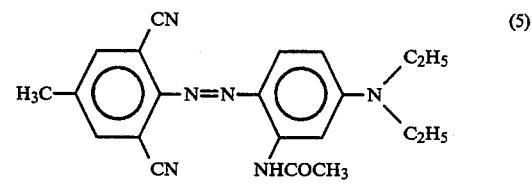

10.0 parts of a polybutyral resin were added to 40.0 parts of methyl ethyl ketone and 40.0 parts of toluene, and the solution was then mixed for about 30 minutes with a paint conditioner by the use of glass beads to prepare the ink.

(2) Preparation of transfer sheet

The thus prepared ink was applied on a polyethylene terephthalate film having a thickness of 3.5 $\mu$m and a back surface subjected to a heat resistance treatment by a gravure calibrator (thickness 30 $\mu$m) so that the dry weight of the ink might be 1.0 g/m$^2$, and the ink was then dried.

(3) Preparation of material to be recorded 0.8 part of a polyester resin (Vylon 103, made by Toyobo Co., Ltd., Tg=47° C.), 0.2 part of an EVA polymerlc plasticizer (Eruvaroi 741, made by Mitsui Polychemical Co., Ltd., Tg=37° C.), 0.04 part of amino-modified silicone (KF-857, made by The Sin-Etus Chemical Co., Ltd.), 0.04 part of epoxy-modified silicone (KF-103, made by The Sin-Etus Chemical Co., Ltd.), 9.0 parts of methyl ethyl ketone/toluene/cyclohexane (weight ratio 4:4:2) were mixed to form a coating solution. This coating solution was then applied onto a synthetic paper (Yupo FPG #150, made by Oji Yuka Co., Ltd.) by means of a bar coater (No. 10, made by RK. Print Cort Instruments Co., Ltd.) so that the dry weight of the coating solution might be 4.5 g/m$^2$, and it was then dried at 100° C. for 15 minutes.

(4) Transfer record

The above-mentioned transfer sheet was superposed upon the material to be recorded so that the ink-applied surface might be brought into contact with the coating solution-applied surface, and recording was then carried out under conditions of a thermal head application voltage of 10 V and a printing time of 4.0 milliseconds by heating the heat transfer sheet from its back surface, thereby recording a yellow color having a color density of 2.1 thereon. This color density was measured by the use of a densitometer RD-918 made by U.S. Macbeth Co., Ltd. A light resistance test of the record was carried out at a black panel temperature of 63±2° C. by the use of a xenon feed meter (made by Suga Tester Co., Ltd.) as a light resistance testing machine. The record scarcely changed after irradiation for 40 hours, and the stability of the image at a high temperature (50° C.) and a high humidity (80%) was also excellent.

A shelf stability test was carried out by allowing the prepared transfer sheet to stand at 25° C. for 2 months, performing transfer record, and then comparing a density of this transfer record with a transfer record density of the transfer sheet immediately after its preparation. As a result, the color density of the transfer record was conveniently unchanged, and it was 2.1.

The fastness of the recorded image was evaluated by allowing the recorded image to stand in an atmosphere at 50° C. for 48 hours, and then observing the sharpness of the image and a coloring state on a white paper by which the image was rubbed. As a result, the sharpness of the image did not change and the white paper was not colored, which meant that the fastness of the recorded image was good.

Examples 2 to 5

The same procedure as in Example 1 was repeated except that a dyestuff used in Example 1 was replaced with dyestuffs shown in Tables 3 and 4, to prepare transfer sheets and materials to be recorded and to carry out transfer record. As a result, black colors having densities shown in Tables 3 and 4 were obtained. The fastness of these black colors was excellent, as in Example 1.

TABLE 3

| Example | Structural Formula | Color of Compound | Parts | Color Density |
|---|---|---|---|---|
| 2 | | | | 2.3 |
| | $O_2N-\langle\bigcirc\rangle-N=N-\langle\bigcirc\rangle-N=N-\langle\bigcirc\rangle-OH$ | Orange | 3.0 | |
| | [benzisothiazole-N=N-(CH₃-substituted phenyl)-N(C₂H₅)(C₂H₄OCOCH₃)] | Blue | 7.0 | |
| | [H₃C-(CN,CN-substituted phenyl)-N=N-(NHCOCH₃-substituted phenyl)-N(C₂H₅)(C₂H₄OCOCH₃)] | Red | 2.0 | |
| 3 | | | | 2.5 |
| | [phenyl-N=N-naphthyl-N=N-phenyl-OH] | Orange | 2.5 | |
| | [(NO₂-substituted benzisothiazole)-N=N-(CH₃-substituted phenyl)-N(C₂H₅)(C₂H₄OCOCH₃)] | Blue | 7.5 | |

TABLE 3-continued

| Example | Structural Formula | Color of Compound | Parts | Color Density |
|---|---|---|---|---|
| | (structure: 2,6-dicyano-4-ethylphenyl azo coupled to aniline with N(C₂H₄OCOCH₃)₂ and NHCOC₂H₅) | Red | 1.5 | |

TABLE 4

| Example | Structural Formula | Color of Compound | Parts | Color Density |
|---|---|---|---|---|
| 4 | | | | 2.2 |
| | (phenyl-N=N-methylnaphthalene-N=N-phenyl-OH) | Orange | 4.0 | |
| | (benzisothiazole-N=N-[2-NO₂, 4-N(C₂H₅)₂]phenyl) | Blue | 6.0 | |
| | (2,6-dicyano-4-methylphenyl azo to aniline with N(C₂H₅)₂ and NHSO₂CH₃) | Red | 1.5 | |
| 5 | | | | 2.4 |
| | (HO-phenyl-N=N-[NO₂]phenyl-N=N-phenyl-OH) | Orange | 5.0 | |
| | (benzisothiazole-N=N-[2-Cl, 4-N(C₂H₄OH)₂]phenyl) | Blue | 5.0 | |
| | (2,6-dicyano-4-isopropylphenyl azo to aniline with N(C₂H₅)₂ and NHCOC₂H₅) | Red | 2.0 | |
| 6 | | | | 2.5 |

TABLE 4-continued

| Example | Structural Formula | Color of Compound | Parts | Color Density |
|---------|-------------------|-------------------|-------|---------------|
| | HO—⟨phenyl⟩—N=N—⟨naphthyl⟩—N=N—⟨phenyl⟩ | Orange | 2.5 | |
| | benzisothiazole—N=N—⟨tolyl with CH₃⟩—N(C₂H₅)(C₂H₄OCOCH₃) | Blue | 7.5 | |
| | H₅C₂—⟨phenyl with CN, CN⟩—N=N—⟨phenyl with NHCOC₂H₅⟩—N(C₂H₄OCOCH₃)₂ | Red | 1.5 | |

Comparative Examples 1 and 2

The same procedure as in Example 1 was repeated except that a dyestuff used in Example 1 was replaced with dyestuffs shown in Table 5, to prepare transfer sheets and materials to be recorded, followed by transfer record.

In Comparative Example 1, the solubility of the dyestuffs (A) and (B) was low, and the sublimable properties of these dyestuffs were different. Accordingly, obtained images were not black but dark red.

In Comparative Example 2, the solubility of the dyestuff (D) was high, but the absorption of the light having a wave length of from 400 to 550 nm was sharp. Furthermore, the solubility of the dyestuff (E) was low, and a transferred image was red and its color density was low.

TABLE 5

| Comp. Example | Dyestuff | Structural Formula | Parts | Color Density |
|---------------|----------|-------------------|-------|---------------|
| 1 | | | | 1.2 |
| | A | naphthalene-N=⟨isoindolinone⟩ | 3.5 | |
| | B | anthraquinone with NH—phenyl, Br, NH₂ | 6.5 | |

TABLE 5-continued

| Comp. Example | Dyestuff | Structural Formula | Parts | Color Density |
|---|---|---|---|---|
|  | C | (structure: 2,6-dicyano-4-methylphenyl azo coupled to N,N-diethyl-3-acetamido aniline) | 3.0 |  |
| 2 |  |  |  | 1.4 |
|  | D | (structure: 3-cyano-4-methyl-6-hydroxy-1-methyl-2-pyridone azo coupled to 4-(N-(2-ethylhexyl)carbamoyl)phenyl) | 5.5 |  |
|  | E | (1,5-diamino-4,8-dihydroxy-2-bromo anthraquinone) | 4.5 |  |
|  | F | (structure: 2,6-dicyano-4-methylphenyl azo coupled to N,N-dipropyl-3-methanesulfonamido aniline) | 3.5 |  |

Example 7

By the use of a blue dyestuff represented by the formula (6)

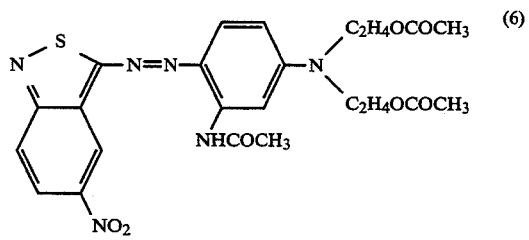

an ink was prepared and a transfer sheet and a material to be recorded were formed, and transfer record was then carried out in accordance with the undermentioned procedure.

(1) Preparation of ink 3 parts of a dyestuff of the formula (6), 4.5 parts of a polybutyral resin, 46.25 parts of methyl ethyl ketone and 46.25 parts of toluene were mixed for about 30 minutes with a paint conditioner by the use of glass beads to prepare an ink.

(2) Preparation of transfer sheet

The thus prepared ink was applied on a polyethylene terephthalate film having a thickness of 9 μm and a back surface subjected to a heat resistance treatment by a gravure calibrator (thickness 30 μm) so that the dry weight of the ink might be 1.0 g/m², and the ink was then dried.

(3) Preparation of material to be recorded 0.8 part of a polyester resin (Vylon 103, made by Toyobo Co., Ltd., Tg=47° C.), 0.2 part of an EVA polymeric plasticizer (Eruvaroi 741p, made by Mitsui Polychemical Co., Ltd., Tg=−37° C.), 0.04 part of amino-modified silicone (KF-857, made by The Sin-Etus Chemical Co., Ltd.), 0.04 part of epoxy-modified silicone (KF-103, made by The Sin-Etus Chemical Co., Ltd.) and 9.0 parts of methyl ethyl ketone/toluene/cyclohexane (weight ratio 4:4:2) were mixed to form a coating solution. The thus formed coating solution was then applied onto a synthetic paper (Yupo FPG 150, made by Oji Yuka Co., Ltd. ) by means of a bar coater (No. 1, made by RK Print Coat Instruments Co., Ltd. ) so that the dry weight of the coating solution might be 4.5 g/m², and it was then dried at 100° C. for 15 minutes.

(4) Transfer record

The above-mentioned transfer sheet was superposed upon the material to be recorded so that the ink-applied surface might be brought into contact with the coating solution-applied surface, and recording was then carried out under conditions of a thermal head application voltage of 10 V and a printing time of 4.0 milliseconds by heating the heat transfer sheet from its back surface, thereby recording a blue color having a color density of 2.66. This color density was measured by the use of a densitometer RD-514 type (filter: latten No. 58) made by U.S. Macbeth Co., Ltd.

The color density was calculated in accordance with the formula

Color density = $\log_{10}(I_0/I)$ $I_0$ = Intensity of reflected light from a standard white reflector plate $I$ = Intensity of reflected light from a test piece.

A light resistance test of the record was made under the irradiation of light of 120 KJ by the use of a xenon feed meter (made by Suga Tester Co., Ltd.). As a result, the residual ratio of a color density was 92.1%, which meant that the record scarcely changed, and the stability of the image at a high temperature and a high humidity was also excellent. The fastness of the recorded image was evaluated by allowing the image to stand in an atmosphere at 50° C. for 48 hours, and then observing the sharpness of the image and a coloring state on a white paper by which the image was rubbed. As a result, the sharpness of the image did not change and the white paper was not colored, which meant that the fastness of the recorded image was good.

Example 8

By the use of a compound represented by the formula (7)

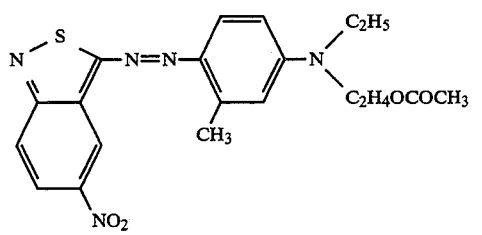

an ink was prepared, a transfer sheet and a material to be recorded were formed, and transfer record was carried out in accordance with the undermentioned procedure.

The same procedure as in Example 7 was repeated to prepare an ink, a transfer sheet and a material to be recorded and to carry out transfer record, so that a blue record having a color density of 2.81 was obtained. The light resistance test of the record was made in the same manner as in Example 7. As a result, the residual ratio of a color density was 91.9%, and the stability of the image at a high temperature and a high humidity was also excellent. The fastness of the recorded image was evaluated in the same manner as in Example 7, and as a result, the sharpness of the image did not change and the white paper was not colored, which meant that the fastness of the recorded image was good.

Examples 9 to 20

In accordance with the same procedure as in Example 7, there were prepared azo dyestuffs shown in Tables 6 and 7, inks, transfer sheets and materials to be recorded were prepared, and transfer record was then carried out. The obtained record densities were shown in Tables 6 and 7.

The light resistance test of these records was all made in the same manner as in Example 7. As shown in Tables 6 and 7, the records scarcely changed, and the stability of images at a high temperature and a high humidity was also excellent. The fastness test of these images was made in the same manner as in Example 7, but the sharpness of the images did not change and a white paper was not colored, which meant that the fastness of the recorded images was good.

TABLE 6

| Example | Structure of Dyestuff | Density of Transferred Color | Light Resistance (%) |
| --- | --- | --- | --- |
| 9 | | 2.78 | 92.3 |
| 10 | | 2.81 | 90.1 |
| 11 | | 2.69 | 89.7 |

TABLE 6-continued
| Example | Structure of Dyestuff | Density of Transferred Color | Light Resistance (%) |
|---|---|---|---|
| 12 | 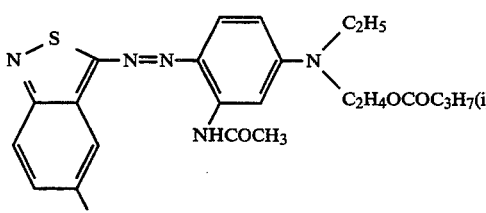 | 2.75 | 93.2 |
| 13 | | 2.82 | 90.5 |
| 14 | | 2.71 | 90.1 |
TABLE 7
| Example | Structure of Dyestuff | Density of Transferred Color | Light Resistance (%) |
|---|---|---|---|
| 15 | 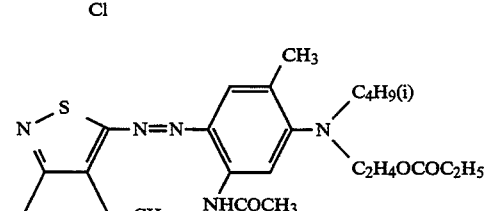 | 2.76 | 91.2 |
| 16 | | 2.71 | 92.0 |
| 17 | 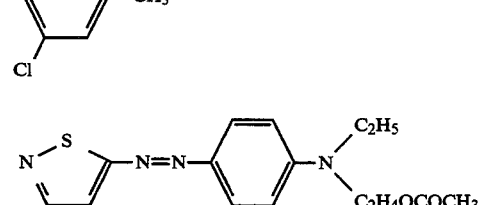 | 2.59 | 82.6 |

TABLE 7-continued

| Example | Structure of Dyestuff | Density of Transferred Color | Light Resistance (%) |
|---|---|---|---|
| 18 | | 2.53 | 84.8 |
| 19 | | 2.81 | 90.7 |
| 20 | | 2.77 | 88.5 |

Comparative Example 3

In accordance with the same procedure as in Example 7, there were prepared an ink, a transfer sheet and a material to be recorded by the use of a dyestuff of the formula (8)

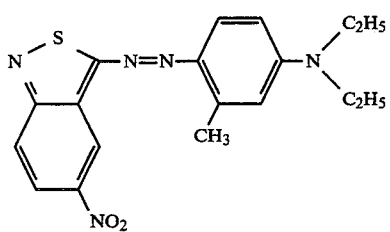

(8)

and transfer record was then carried out.

A color density in the transfer step was as low as 2.1, because the dyestuff crystallized on a transfer sheet. The light resistance test of this record was made in the same manner as in Example 7, and as a result, fading was noticeable, and the residual ratio of a color density was 58.7%. Particularly, in a low-density record portion, a color tone changed to reddish violet or vanished. Moreover, in a fastness test, some soil was confirmed when an image surface was rubbed with a white paper.

What is claimed is:

1. A black dyestuff for heat-sensitive transfer record comprising at least one orange dyestuff represented by the formula (1)

$$Ar_1—N=N—Ar_2—N=N—Ar_3 \quad (1)$$

wherein each of $Ar_1$, $Ar_2$ and $Ar_3$ is independently an aryl group or an aryl group having as a substituent an alkyl group having 1 to 4 carbon atoms, halogen atom, nitro group or hydroxy group; and at least one blue dyestuff represented by the formula (2)

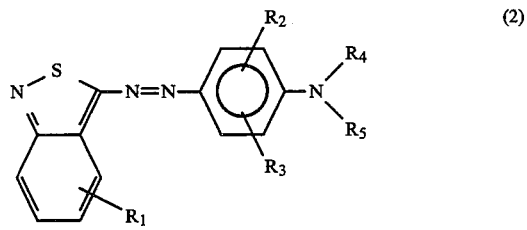

(2)

wherein each of $R_1$, and $R_2$ and $R_3$ is independently a hydrogen atom, halogen atom, nitro group, hydroxy group, alkyl group which may have a substituent, alkoxy group, alkylsulfonylamino group or alkylcarbonylamino group, wherein the alkyl groups therein have 1 to 4 carbon atoms, $R_4$ is an alkyl group having 1 to 8 carbon atoms, which may have a substituent, aralkyl group or alkoxycarbonylethyl group, and $R^6$ is an alkylcarbonylethyl group; wherein the blend ratio of the dyestuff (1) to the dyestuff (2) is from 2:8 to 4:6.

2. The black dyestuff for heat-sensitive transfer record according to claim 1 wherein the blue dyestuff is represented by the formula (2) wherein $R_1$ is a hydrogen atom, halogen atom, alkyl group, alkoxy group or nitro group, $R_2$ and $R_3$ may be identical or different and each of them is independently a hydrogen atom, alkyl group having 1 to 4 carbon atoms, alkoxy group, alkylcarbonylamino group or alkylsulfonylamino group, $R_4$ is an alkyl group having 1 to 8 carbon atoms which may have a substituent, aralkyl group or alkylcarboxyethyl group, and $R_5$ is an alkoxycarbonylethyl group.

* * * * *

UNITED STATES PATENT AND TRADEMARK OFFICE
CERTIFICATE OF CORRECTION

PATENT NO. : 5,358,536
DATED : October 25, 1994
INVENTOR(S) : Hitoshi KOSHIDA et al.

It is certified that error appears in the above-indentified patent and that said Letters Patent is hereby corrected as shown below:

Claim 1, Column 28, Line 55: Delete "$R^6$" and insert -- $R^5$ --.

Signed and Sealed this

Twenty-fourth Day of January, 1995

Attest:

BRUCE LEHMAN

Attesting Officer   Commissioner of Patents and Trademarks